United States Patent [19]

Harvey et al.

[11] 4,249,838
[45] Feb. 10, 1981

[54] SEALED FLIGHT SCREW INJECTOR

[75] Inventors: Andrew C. Harvey, Waltham; Mackenzie Burnett, Wayland, both of Mass.

[73] Assignee: Foster-Miller Associates, Inc., Waltham, Mass.

[21] Appl. No.: 68,962

[22] Filed: Aug. 23, 1979

[51] Int. Cl.³ .............................................. B65G 53/40
[52] U.S. Cl. .................................. 406/51; 198/625; 198/629; 198/795; 406/56; 406/79
[58] Field of Search .................... 406/51, 56, 59–61, 406/79; 198/580, 625, 629, 793, 795, 832; 266/180, 279; 414/158

[56] References Cited

U.S. PATENT DOCUMENTS

| | | | |
|---|---|---|---|
| 1,671,207 | 5/1928 | Parlongue | 198/334 X |
| 2,223,639 | 12/1940 | Ponder | 198/832 |
| 3,841,946 | 10/1974 | Carter | 198/625 X |
| 3,931,999 | 1/1976 | McCain | 406/60 |

FOREIGN PATENT DOCUMENTS 242729  9/1969  U.S.S.R. .................................. 198/832

Primary Examiner—Jeffrey V. Nase
Attorney, Agent, or Firm—Thompson, Birch, Gauthier & Samuels

[57] ABSTRACT

An injector with a pair of counter-rotating screws that are mounted along parallel axes in cylindrical chambers formed in a housing are driven in synchronism by a driver. A series of plates are slidably received in a track provided in the housing and are fitted between successive flights of the screws. The plates are carried by the screws in an endless path within the housing. Pockets formed by the plates, screw flights and chamber walls carry particulate solids from an inlet port to a discharge port of the housing for injection into a pressurized hydraulic transport line.

12 Claims, 4 Drawing Figures

SEALED FLIGHT SCREW INJECTOR

BACKGROUND OF THE INVENTION

1. Field of the Invention

The invention relates to material transport systems and, more particularly, is directed towards an injector for injecting particulate solids into a pressurized transport line.

2. Description of the Prior Art

Mining of coal in modern underground mines involves a highly mechanized operation. Most coal is cut by large continuous mining machines which have large rotating cutting drums. In one haulage system, the cut coal is carried away from the mine face on a short conveyor and fed into a shuttle car. Due to space limitations in the mine, only one shuttle car can be accomodated in the loading area at one time. This batch nature of the shuttle car configuration limits the duty cycle of the continuous mining machine and reduces the productivity of the mining operation. In another haulage system, the cut coal is fed continuously rather than in batches. This system top sizes the coal, premixes it with water in a hopper and pumps the mixture with a centrifugal slurry pump to a preparation plant outside of the mine. Slurry pumps are too large to be used in low coal seams. In addition, slurry mixing prior to injection is impractical in low coal seams because of the level control problem associated with shallow hoppers. Centrifugal pumps for transporting particulate solids suffer from the disadvantage that increasing pressure within the pump results in a decreasing flow rate. A need exists for an improved injector for injecting particulate solids into pressurized transport lines.

SUMMARY OF THE INVENTION

It is an object of the present invention to provide an injector for a continuous transport system.

Another object of the present invention is to provide an injector for injecting particulate solids into a transport line without premixing of the solids with a fluid.

A further object of the present invention is to provide a positive displacement injector for injection of particulate solids into a pressurized transport line. The injector is characterized by a pair of counter-rotating screws that carry a plurality of plates in an endless path. The screws are mounted within a housing along parallel axes and are driven in synchronism by a driver. The plates are slidably received in a track formed in the housing and are fitted between adjacent screw flights. Pockets formed by the chamber walls, plates and screw flights carry particulate solids from an inlet port in a forward end of the housing to a discharge port at the rear of the housing for injection into a pressurized hydraulic transport line.

Other objects of the present invention will in part be obvious and will in part appear hereinafter.

The invention accordingly comprises the apparatuses, processes and products, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
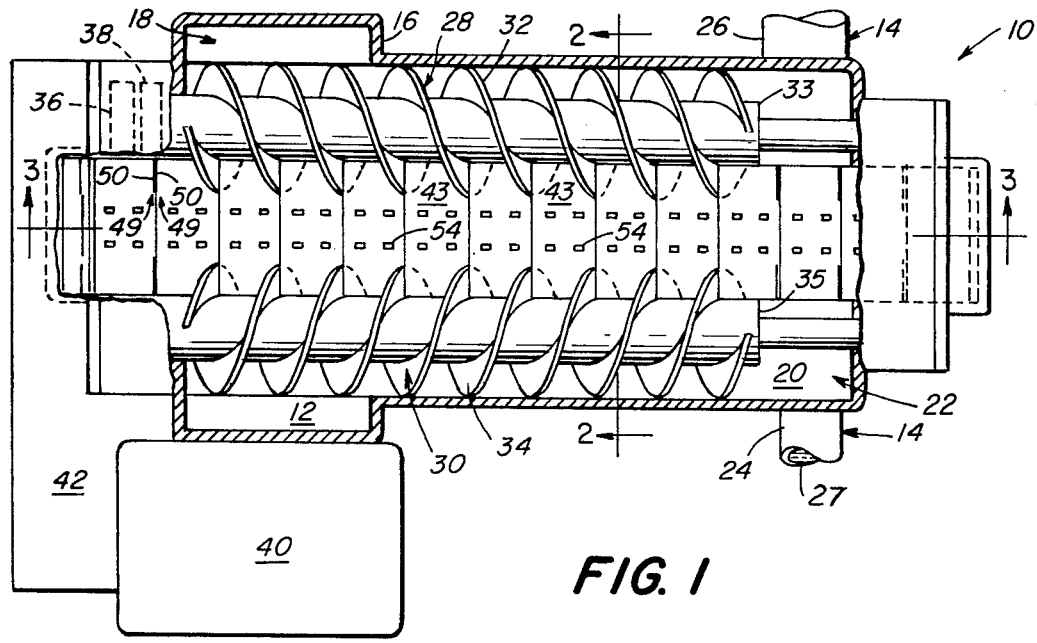
FIG. 1 is a top plan view of a sealed flight screw injector embodying the invention.

Referring now to the drawings, particularly FIG. 1, there is shown a material transport device in the form of a sealed flight screw injector 10 embodying the invention for transporting dry particulate solids from a self-feeding hopper 12 to a transport line 14 through which a fluid flows. Injector 10 includes a housing 16, for example a split housing, having hopper 12 at an input station 18 and a slurry chamber 20 at an output station 22, the input and output stations being disposed at opposite ends of the housing. Transport line 14, for example a pressurized hydraulic transport line, includes an input conduit 24 and an output conduit 26 that are connected to slurry chamber 20. The particulate solids are mixed in chamber 20 with a fluid 27, for example water, that enters the chamber through inlet conduit 24 to form a slurry which is carried out of the chamber through outlet conduit 26 by the pressurized flow in transport line 14.

Figure 2:
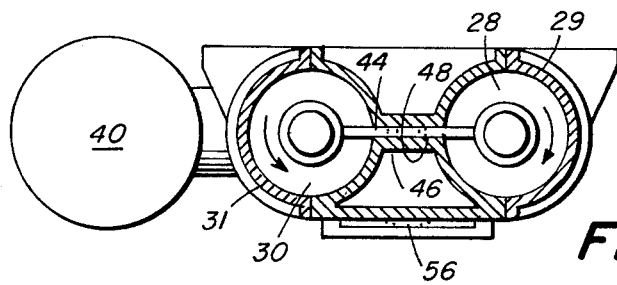
FIG. 2 is a sectional view taken along the lines 2—2 in FIG. 1.
Figure 3:
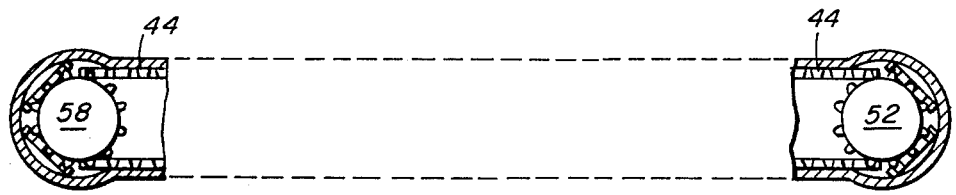
FIG. 3 is a sectional view taken along the lines 3—3 in FIG. 1.

Injector 10 includes a pair of synchronously driven, counter-rotating screws 28 and 30 that are mounted along parallel axes in chambers 29 and 31 that are formed in housing 16. Screw 28 has a helical blade 32 that is wound right-handed about a shaft 33 and screw 30 has a helical blade 34 that is wound left-handed about a shaft 35, the diameter of each blade being approximately fifteen inches. Each end of each screw 28, 30 is journaled in a lubricated bearing 36 which is outboard of a mechanical seal 38. Preferably, each screw 28 and 30 is composed of a metal such as a deep-case hardened, high strength steel. As viewed in FIG. 2, screw 28 is rotated clockwise and screw 30 is rotated counter-clockwise by a driver 40, for example a 200 HP motor, through a gear assembly 42.

The particulate solids, for example coal, that are in hopper 12 are picked up by rotating screws 28, 30 and are carried from input station 18 to output station 20 in compartments or pockets 43 formed by chamber 29, 31; screws 28, 30; and a series of plates 44 that ride in a track 46 formed in housing 16. A wear resistant stratum 48 is provided on the underside of each plate 44 which contacts track 46. One edge of each plate 44 is fitted between successive turns of blade 32 and an opposite edge of each plate is fitted between successive turns of blade 34. The margins of plates 44 which contact the flights of blades 32 and 34 are notched at 49 so that the edges of adjacent plates are in contact. Preferably, seals 50 are provided in the notched edges of plates 44 to provide a sealing contact with the flights of blades 32 and 34. Seals 50 are composed of a material which is softer than the material of blades 32 and 34 in order to minimize wear of the blades. Plates 44 are moved in an endless path from input station 18 to output station 20 by synchronously driven counter-rotating blades 32 and 34. As each plate 44 reaches the end of the flights of screws 28 and 30, it is engaged by a sprocket 52 which is driven in synchronism with the rotating screws. Each plate 44 is provided with sprocket holes 54 that are engaged by sprocket 52. Sprocket 52 carries plates 44 through a 180° turn and into a return track 56 in housing 16. Plates 44 are pushed by sprocket 52 in a continuous train towards input station 18. A powered sprocket 58, which is driven synchronously with sprocket 52, engages sprocket holes 54 and carry plates 44 through a 180° turn towards track 46. Then, plates 44 are engaged by screws 28 and 30 for movement from input station 18 towards output station 20.

In the preferred embodiment, the sides of the first flights of screws 28 and 30 adjacent input station 18 are undercut to facilitate engagement of plates 44. As can be seen in FIG. 1, plates 44 are engaged by screws 28 and 30 prior to entering hopper 12 in order to insure that particulate solids do not become caught between seals 50 and blades 32, 34. The particulate solids are removed from the medial portions of plates 44 by housing 16, the particulate solids being carried from input station 18 to slurry chamber 20 on the upper surface of plate 44 in pockets 43. As plates 44 pass through chamber 20 they are washed clean of particulate solids by water 27 which enters inlet conduit 24 before the plates are turned towards return track 56.

Figure 4:
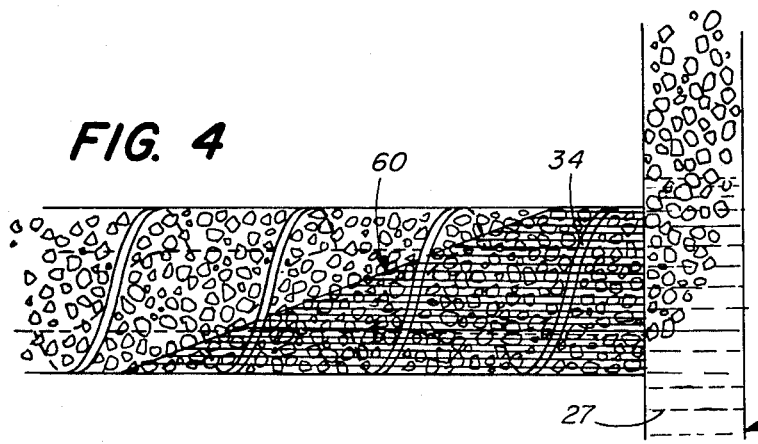
FIG. 4 is a schematic diagram illustrating certain principles of the invention.

As previously described, dry particulate solids in hopper 12 are transported through housing 16 in pockets 43 to slurry chamber 20 and are carried away by the fluid flow in transport line 14. Since the particulate solids are dry at input station 18, air must be purged prior to injection of the particulate solids into transport line 14. The design of injector 10 is such that a controlled leakage of fluid is present between the tips of blades 32, 34 and housing 16 and also between plates 44 and the screw flights and shaft of screws 28, 30. In the preferred embodiment, the clearance between housing 16, plates 33 and blades 32, 34 is approximately 0.025 inch. FIG. 4 is a schematic representation of air purging to displace the air. Due to the forward motion of the particulate solids, an equilibrium point is reached where the motion of the particulate solids is equal to the relative water leakage speed. At this point, an air/water interface, denoted by reference character 60, is created.

In alternate embodiments, the number of helical blade screws is other than two; for example one, three, four, etc. In the case of three screws, two series of plates are slidably received in a pair of parallel tracks disposed between the flights of adjacent screws. One series of plates is fitted between the flights of the first and second screws and the other series of plates is fitted between the flights of the second and the third screws. In the case of four screws, there are three series of plates fitted between the flights of adjacent screws.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A material transport device comprising:
   (a) a housing with an inlet station at one end and an outlet station at an opposite end;
   (b) first screw means with first helical blade means mounted within said housing for rotation about a first axis;
   (c) second screw means with second helical blade means mounted within said housing for rotation about a second axis, said first axis in spaced parallel relationship with said second axis;
   (d) a plurality of plate means slidably mounted within said housing, one of each said plate means fitted between successive turns of each of said first and second blade means, a pocket for carrying material to be transported from said inlet station to said outlet station formed by each of said plate means and said first and second blade means, and said housing; and
   (e) driver means drivingly connected to said first and second screw means for rotating said first and second screw means synchronously in opposite directions for moving said plate means from said inlet station to said outlet station.

2. The material transport device as claimed in claim 1 wherein said first blade means is wound right-handed and said second blade means is wound left-handed, said first screw means rotated in a clockwise direction and said second screw means rotated in a counterclockwise direction.

3. The material transport device as claimed in claim 1 including sprocket means drivingly connected to said driver means, said plates formed with sprocket holes configured to be engaged by said sprocket means.

4. The material transport device as claimed in claim 3 wherein said sprocket means includes first and second sprockets, each of said plate means engaged by said first sprocket at said outlet station, each of said plate means engaged by said second sprocket prior to engagement by said first and second screw means at said inlet station.

5. The material transport device as claimed in claim 1 wherein said housing is formed with track means on which said plate means ride, each of said plate means having a wear resistant stratum which is in contact with said track means.

6. The material transport device as claimed in claim 1 wherein each of said plate means includes seals which are in contact with said first and second blade means when said plate means are moved by said first and second screw means.

7. The material transport device as claimed in claim 6 wherein said housing includes a hopper at said inlet station for reception of the material to be transported and a chamber at said outlet station in which the material to be transported is deposited for injection into a transport line connected to said chamber.

8. A material transport system for injecting particulate solids into a pressurized hydraulic transport line, said device comprising:
   (a) a housing with an inlet station at one end and a slurry chamber at an opposite end, said slurry chamber configured to be interconnected with a pressurized hydraulic transport line;
   (b) first screw means mounted within said housing for rotation about a first axis;
   (c) second screw means mounted within said housing for rotation about a second axis, said first axis in spaced parallel relationship with said second axis;
   (d) a plurality of plate means slidably mounted within said housing intermediate said first and second screw means, each of said plate means constrained for movement in an endless path between said inlet station and said slurry chamber, each of said plates formed with at least one sprocket hole, one of each said plate means fitted between successive turns of said first and second screw means, a pocket for carrying the particulate solids from said inlet station to said slurry chamber formed by said housing, said first and second screw means and said plate means;
(e) sprocket means mounted within said housing for engagement with said sprocket holes; and
(f) driver means drivingly connected to said first screw means, said second screw means and said sprocket means, said driver means synchronously rotating said first screw means and said second screw means in opposite directions for moving each of said plate means from said inlet station to said slurry chamber, said sprocket means driven by said driver means in synchronism with said first and second screw means.

9. The material transport system as claimed in claim 8 wherein each of said plate means includes seals at marginal edges thereof which are in contact with said turns of said first and second screw means.

10. The material transport system as claimed in claim 8 wherein said housing is formed with track means on which said plate means ride between said inlet station and said slurry chamber.

11. The material transport system as claimed in claim 8 wherein said first screw means and said second screw means have oppositely wound helical blades, said first screw means and said second screw means rotated in opposite directions by said driver for advancing said plate means from said inlet station to said slurry chamber.

12. A material transport device comprising:
(a) a housing with an inlet station at one end and an outlet station at an opposite end;
(b) screw means with helical blades means mounted within said housing for rotation;
(c) a plurality of plate means slidably mounted within said housing, one of each said plate means fitted between successive turns of said blade means, a pocket for carrying material to be transported from said inlet station to said outlet station formed by each of said plate means and said blade means and said housing; and
(d) driver means drivingly connected to said screw means for rotating said screw means for moving said plate means from said inlet station to said outlet station.

* * * * *